(12) United States Patent  (10) Patent No.: US 8,150,477 B2
Cho et al.  (45) Date of Patent: Apr. 3, 2012

(54) MOBILE STATION AND METHOD FOR PROVIDING ULTRA POWER-SAVING MODE IN MOBILE STATION

(75) Inventors: Sung Rae Cho, Daejeon (KR); Hoo Sung Lee, Daejeon (KR); Byung Jo Kim, Daejeon (KR); Seong Su Park, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 1162 days.

(21) Appl. No.: 11/986,831

(22) Filed: Nov. 27, 2007

(65) Prior Publication Data

US 2008/0139256 A1  Jun. 12, 2008

(30) Foreign Application Priority Data

Dec. 7, 2006  (KR) ........................ 10-2006-0123887

(51) Int. Cl.
*H04M 1/00* (2006.01)
(52) U.S. Cl. ........................ 455/574; 370/318
(58) Field of Classification Search .................. 455/574; 370/338
See application file for complete search history.

(56) References Cited

U.S. PATENT DOCUMENTS

| 7,020,477 B2 * | 3/2006 | Cramby et al. ............... 455/458 |
| 2004/0023672 A1 | 2/2004 | Terry |
| 2004/0029596 A1 * | 2/2004 | Kim et al. ..................... 455/458 |

FOREIGN PATENT DOCUMENTS

| JP | 06-006302 | 1/1994 |
| KR | 1020000010344 | 2/2000 |
| KR | 1020010076793 | 8/2001 |
| KR | 1020010087590 | 9/2001 |
| KR | 1020010088553 | 9/2001 |
| KR | 2003-0026869 | 4/2003 |
| KR | 1020040108273 | 12/2004 |
| KR | 1020050023822 | 3/2005 |
| KR | 1020050058797 | 6/2005 |
| KR | 1020060029953 | 4/2006 |
| KR | 10-2006-0037078 | 5/2006 |
| KR | 10-2006-0073759 | 6/2006 |
| WO | WO 2006-025024 | 3/2003 |

* cited by examiner

*Primary Examiner* — Marcos Batista
(74) *Attorney, Agent, or Firm* — Blakely, Sokoloff, Taylor & Zafman

(57) ABSTRACT

Provided are a mobile station and a method for providing an ultra power-saving mode in a mobile station. The method for providing an ultra power-saving mode in a mobile station includes: inactivating a communication function in a standby mode of the mobile station; extracting a DRX (discontinuous reception) cycle length coefficient K of the mobile station; determining a class-specific DRX cycle length coefficient Ni of the mobile station; replacing K with Ni; and monitoring a paging signal at a paging cycle corresponding to Ni.

8 Claims, 6 Drawing Sheets

FIG. 6

| DRX Cycle Length Coefficient (k) | DRX Cycle Length ($2^k$) | PICH occasion interval (s) | |
|---|---|---|---|
| 6 | 64 frames | 0.64 s | standby Mode (610) |
| 7 | 128 | 1.28 | |
| 8 | 254 | 2.54 | |
| 9 | 512 | 5.12 | |
| $N_1$ | $2^{N_1}$ | $2^{N_1}$ *10 ms | Ultra Power -Saving Mode (620) |
| $N_2$ | $2^{N_2}$ | $2^{N_2}$ *10 ms | |
| ... | ... | ... | |
| $N_i$ | $2^{N_i}$ | $2^{N_i}$ *10 ms | |

# MOBILE STATION AND METHOD FOR PROVIDING ULTRA POWER-SAVING MODE IN MOBILE STATION

CROSS-REFERENCE TO RELATED APPLICATION

This application claims priority to and the benefit of Korean Patent Application No. 2006-123887 filed Dec. 7, 2006, the disclosure of which is incorporated herein by reference in its entirety.

BACKGROUND

1. Field of the Invention

The present invention relates to a mobile station and a method for providing an ultra power-saving mode in a mobile station.

The present invention has been produced from the work supported by the IT R&D program of MIC (Ministry of Information and Communication)/IITA (Institute for Information Technology Advancement) [2005-S-017-02, Integrated Development of Ultra Low Power RF/HW/SW SoC] in Korea.

2. Discussion of Related Art

Handheld mobile stations were developed to provide a call service out of doors or while moving, it has two operation modes (a call mode and a standby mode) when it is powered on.

As mobile communication technology develops, mobile stations provide various supplementary services in addition to a telephone call service. Sometimes, a user wants to engage such supplementary services, including in places where it is difficult to use a telephone call service such as in a conference room or a theater.

In such instances, the concentrated mobile terminal, a user can power off or change an operation mode to a mute mode or a vibration mode. If powered off, a user cannot use the supplementary services, and, even though a mute mode or a vibration mode may be set, the mobile station's power consumption is still high. This is because an operation necessary for a telephone call service could be internally performed even though a user uses only the supplementary services and not the telephone call service.

SUMMARY OF THE INVENTION

The present invention is directed to a mobile station in which an existing standby mode is complemented to provide an ultra power-saving mode for inactivating a mobile communication-related function, the communication function being inactivated according to a user's intention, leading to lower power consumption.

The present invention is also directed to a method for providing an ultra power-saving mode in which an existing standby mode is complemented to provide an ultra power-saving mode for inactivating a mobile communication-related function, and so a communication function is inactivated according to a user's intention, leading to lower power consumption.

One aspect of the present invention provides a method for providing an ultra power-saving mode in a mobile station, comprising the steps of: inactivating a communication function in a standby mode of the mobile station; extracting a DRX cycle length coefficient 'k' of the mobile station; determining a class-specific DRX cycle length coefficient $N_i$ of the mobile station; replacing 'k' with $N_i$; and monitoring a paging signal at a paging detecting cycle corresponding to $N_i$.

The DRX cycle may have a length of $2^k$ frames.

the paging cycle corresponding to Ni is [(IMSI div M) mod DRX cycle length]+$(2^{Ni})$, where IMSI represents an international mobile system indicator, M represents a secondary common control physical channel (SCCPCH) coefficient including a paging type 1 signal $N_i$ is greater than 'k'. $N_i$ is determined according to a class defined by a service profile of the mobile station.

The method for providing an ultra power-saving mode may further comprise the steps of replacing $N_i$ with 'k'; and monitoring a paging signal at a paging detecting cycle corresponding to 'k'.

the paging signal transmitted periodically corresponding to $N_i$ comprises text message information and incoming call record information.

Another aspect of the present invention provides a method for providing an ultra power-saving mode in a mobile station, comprising the steps of: transmitting a paging signal to the mobile station; waiting for a paging response signal for a predetermined time; determining a class-specific DRX cycle length coefficient $N_i$ of the mobile station when the paging response signal is not received within the predetermined time; and paging at a paging cycle corresponding to $N_i$.

the paging signal transmitted periodically corresponding to $N_i$ comprises text message information and incoming call record information.

Yet another aspect of the present invention provides a mobile station, comprising: a telephone call inactivating portion for inactivating a telephone call function in a standby mode; a storing portion for storing a DRX cycle length coefficient 'k' and a class-specific DRX cycle length coefficient $N_i$; a mode changing portion for replacing 'k' with $N_i$ to monitor a paging signal at a paging detecting cycle corresponding to $N_i$.

The paging cycle corresponding to $N_i$ is [(IMSI div M) mod DRX cycle length]+$(2^{Ni})$, where IMSI represents an international mobile system indicator, M represents a secondary common control physical channel (SCCPCH) coefficient including a paging type 1 signal, and the DRX cycle length uses $2^k$ which is pre-set.

$N_i$ is greater than 'k'. $N_i$ is determined according to a class defined by a service profile of the mobile station.

The paging signal transmitted periodically corresponding to $N_i$ comprises text message information and incoming call record information.

BRIEF DESCRIPTION OF THE DRAWINGS

The above and other features and advantages of the present invention will become more apparent to those of ordinary skill in the art by describing in detail preferred embodiments thereof with reference to the attached drawings in which:

FIG. 6 is a table illustrating the relationship between a DRX cycle length coefficient and a DRX cycle length according to the exemplary embodiment of the present invention.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. Therefore, the following embodiments are not described for the purpose of limitation, but are described in order for this disclosure to be complete and enabling to those of ordinary skill in the art.

Figure 1:
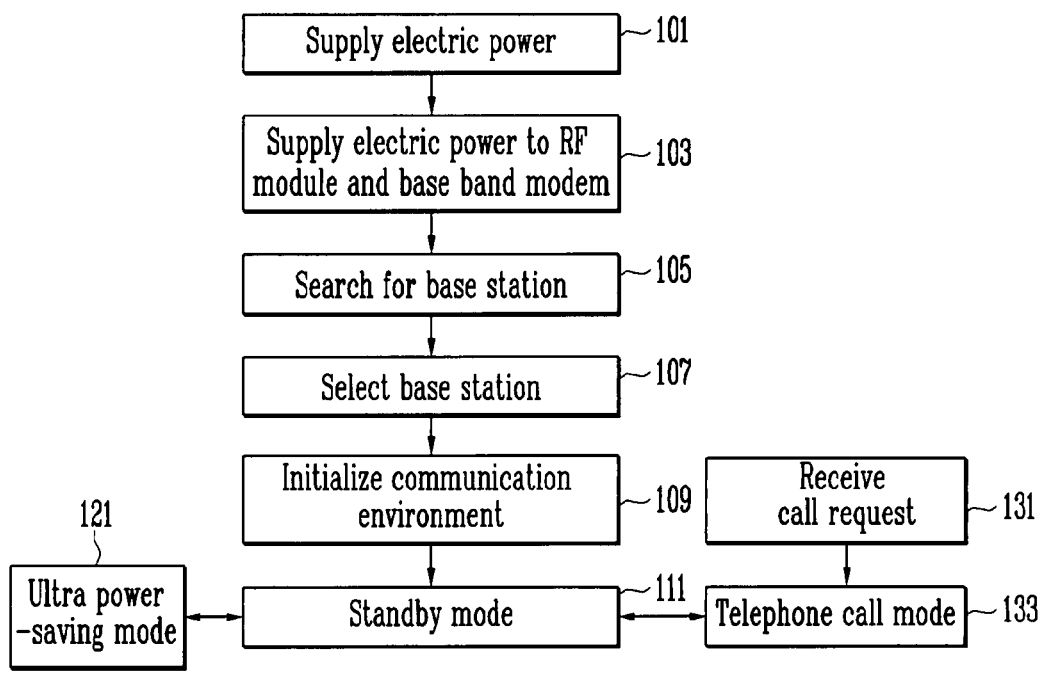
FIG. 1 is a flowchart illustrating a mode changing procedure in a mobile station according to an exemplary embodiment of the present invention.

FIG. 1 is a flowchart illustrating a mode changing procedure in a mobile station according to an exemplary embodiment of the present invention.

Referring to FIG. 1, a mobile station is powered on (step 101), electrical power is supplied to a radio frequency (RF) module and a base band modem of the mobile station (step 103), and the mobile station searches for base stations with which it can communicate (step 105). The mobile station selects a base station from which a signal with the highest strength is received among the searched base stations (step 107), when the base station is selected, the mobile station initializes its communication environment (step 109) and enters a standby mode (step 111). When a call request signal is received in the standby mode (step 113), that is, when a telephone call is requested to the mobile station, the mobile station changes its operation mode from the standby mode to the telephone call mode (step 133). The conventional mobile station has two modes, the telephone call mode and the standby mode, whereas the inventive mobile station can additionally enter an ultra power-saving mode from the standby mode according to a user's intention (step 121).

The ultra power-saving mode will be described in detail hereinafter.

Figure 2:
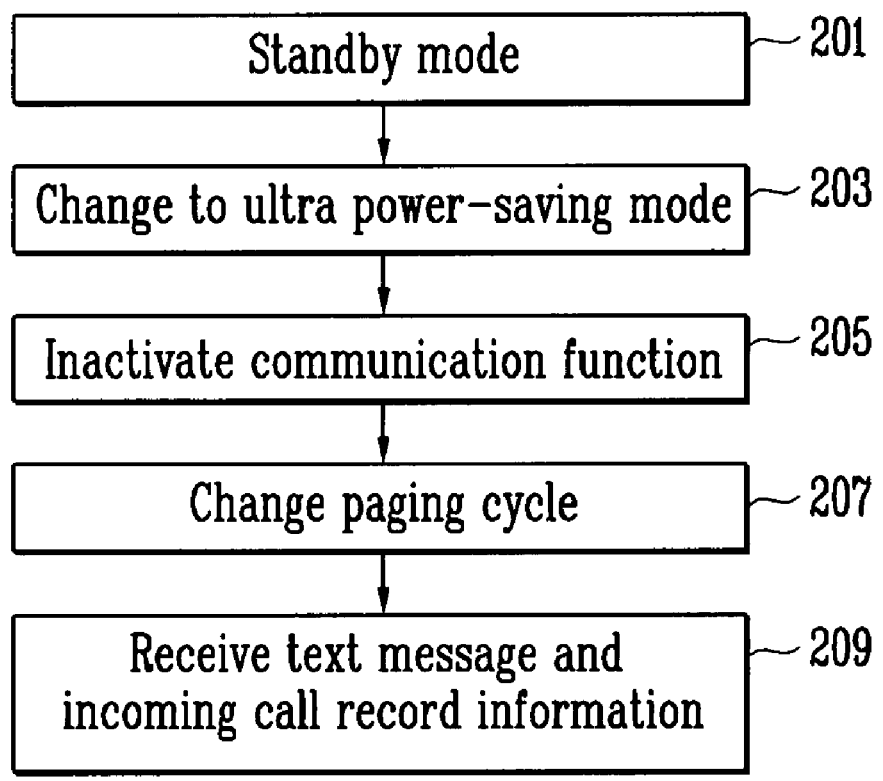
FIG. 2 is a flowchart illustrating a procedure for entering an ultra power-saving mode according to the exemplary embodiment of the present invention.

FIG. 2 is a flowchart illustrating a procedure for entering the ultra power-saving mode according to the exemplary embodiment of the present invention.

Referring to FIG. 2, the ultra power-saving mode can be activated in the standby mode (step 201). That is, in a situation where a telephone call is not performed, the operation mode can be changed according to a user's intention. The operation mode of the mobile station is changed to the ultra power-saving mode by a user (step 203). As a result, a communication function is inactivated (step 205). The ultra power-saving mode maximizes a paging detecting cycle in a situation where a telephone call is not needed to thereby minimize power consumption, and thus it does not need a communication function.

Then, the paging detecting cycle is changed (step 207). A procedure for changing the paging detecting cycle will be described in detail later, but the present invention is first directed to increasing the paging detecting cycle in the ultra power-saving mode compared to the standby mode. Thus, power consumption necessary for receiving the paging signal is minimized, and when it enters the telephone call mode again, the mobile station does not need to perform operations for searching for and selecting the base station and initializing the communication environment which should be performed when powered on again in the conventional art.

In the ultra power-saving mode, the paging signal may comprise text message information or incoming call record information. That is, in the ultra power-saving mode, the mobile station does not provide a telephone call service but can provide a text message service. In addition, a user can check incoming call record information which he/she did not answer during the ultra power-saving mode (step 209).

Preferably, the mobile station periodically searches for the base station for mobility of the mobile station (i.e., handoff).

Figure 3:
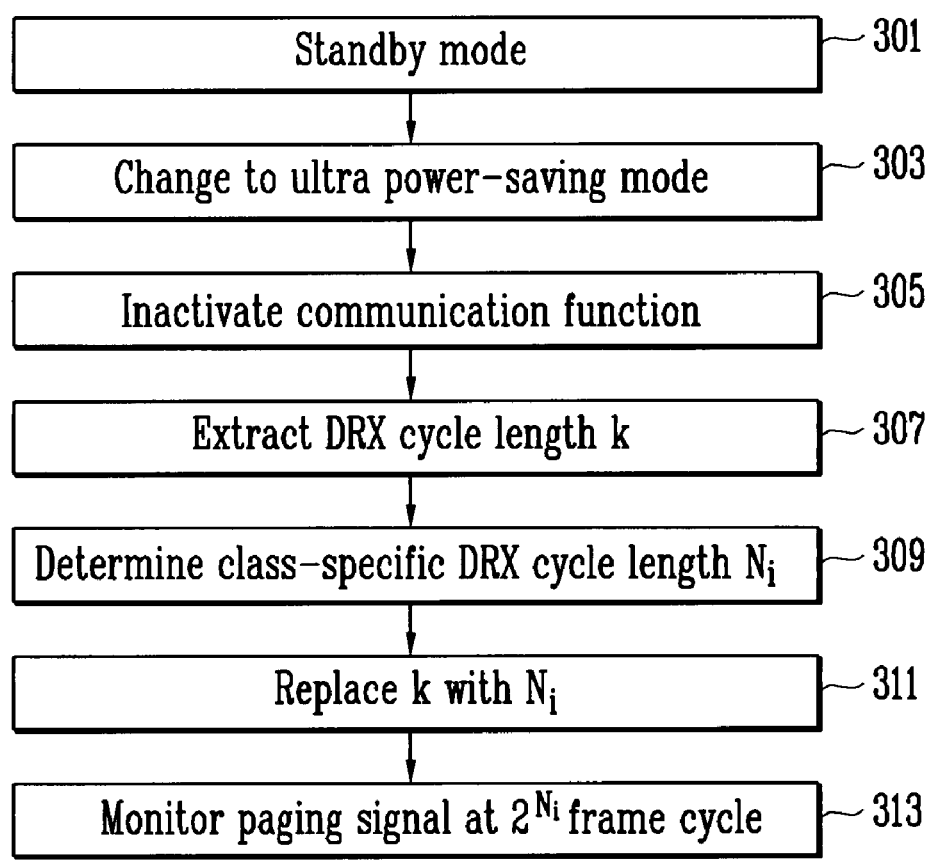
FIG. 3 is a flowchart illustrating a procedure for changing a paging detecting cycles in the ultra power-saving mode according to the exemplary embodiment of the present invention.

FIG. 3 is a flowchart illustrating a procedure for changing the paging detecting cycle in the ultra power-saving mode according to the exemplary embodiment of the present invention.

Referring to FIG. 3, a mobile station is in the standby mode (step 301) and its operation mode is changed to the ultra power-saving mode by a user's operation (step 303). The communication function is inactivated (step 305), and a discontinuous reception (DRX) cycle length coefficient 'k' is extracted. The mobile station monitors a paging indicator channel (PICH) signal transmitted from the base station. That is, the mobile station monitors the PICH signal at the DRX cycle. Here, the DRX cycle depends on $2^k$ frames.

The paging cycle is:

$$[(\text{IMSI div M}) \bmod \text{DRX cycle length}] + (n*\text{DRX cycle length}), \qquad \text{[Formula 1]}$$

where IMSI is an identifier of the international mobile system, and 'M' represents a secondary common control physical channel (SCCPCH) coefficient including a paging type 1 signal.

Then, a class-specific DRX cycle coefficient $N_i$ is determined according to a predetermined value (step 309).

The paging cycle length coefficient 'k' is replaced with the class-specific DRX cycle length coefficient $N_i$ to change the paging cycle (step 311).

Here, $N_i$ is a value for a class (i) which service providers define according to a mobile station service profile using a IMSI table, in order to increase the paging detecting cycle for the ultra power-saving mode.

After 'k' is replaced with $N_i$, the paging cycle is:

$$[(\text{IMSI div M}) \bmod \text{DRX cycle length}] + (2^{N_i}), \qquad \text{[Formula 2]}$$

where IMSI stands for international mobile system indicator, and M represents a secondary common control physical channel (SCCPCH) coefficient including a paging type 1 signal.

Thus, since the paging detecting cycle is determined by $N_i$, which is larger than 'k', the paging detecting cycle in the ultra power-saving mode is much longer than that in the standby mode.

Figure 4:
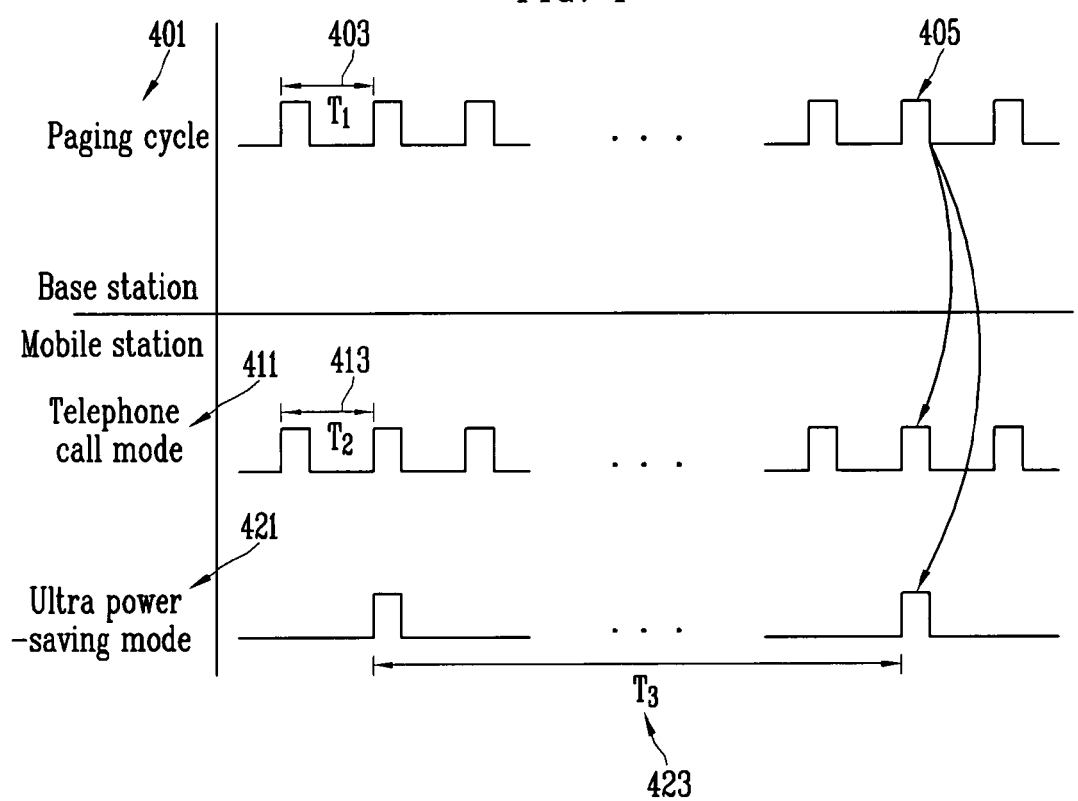
FIG. 4 illustrates paging cycles according to an operation mode of the mobile station according to the exemplary embodiment of the present invention.

FIG. 4 illustrates paging cycles according to operation modes of the mobile station according to the exemplary embodiment of the present invention.

Referring to FIG. 4, a paging cycle of the base station (401), a paging detecting cycle (411) in the standby mode and a paging detecting cycle (421) in the ultra power-saving mode are shown.

The paging cycle of the base station (401) is basically same to the paging detecting cycle in the standby mode (411). That is, the paging cycle $T_1$ labeled at 403 is identical to the paging cycle $T_2$ labeled at 413.

In the standby mode, the paging detecting cycle of the mobile station is synchronized with the paging detecting cycle of the base station, and the paging cycle in the standby mode is smaller than that in the ultra power-saving mode.

That is, as described in FIG. 3, the paging detecting cycles $T^1$ and $T^2$, respectively labeled at 403 and 413, are determined by the coefficient 'k' and have the length of $2^k$ frames.

On the other hand, the paging detecting cycle 421 in the ultra power-saving mode is longer than that in the standby mode. This is because the paging detecting cycle $T_3$ in the ultra power-saving mode has the length of $2^{Ni}$ frames.

Here, the paging signal 405 transmitted from the base station at the paging cycle 401 may comprise the text message information and the incoming call record information. Thus, the mobile station can obtain the text message information and the non-answering incoming call information even in the ultra power-saving mode, similar to the standby mode.

Figure 5:
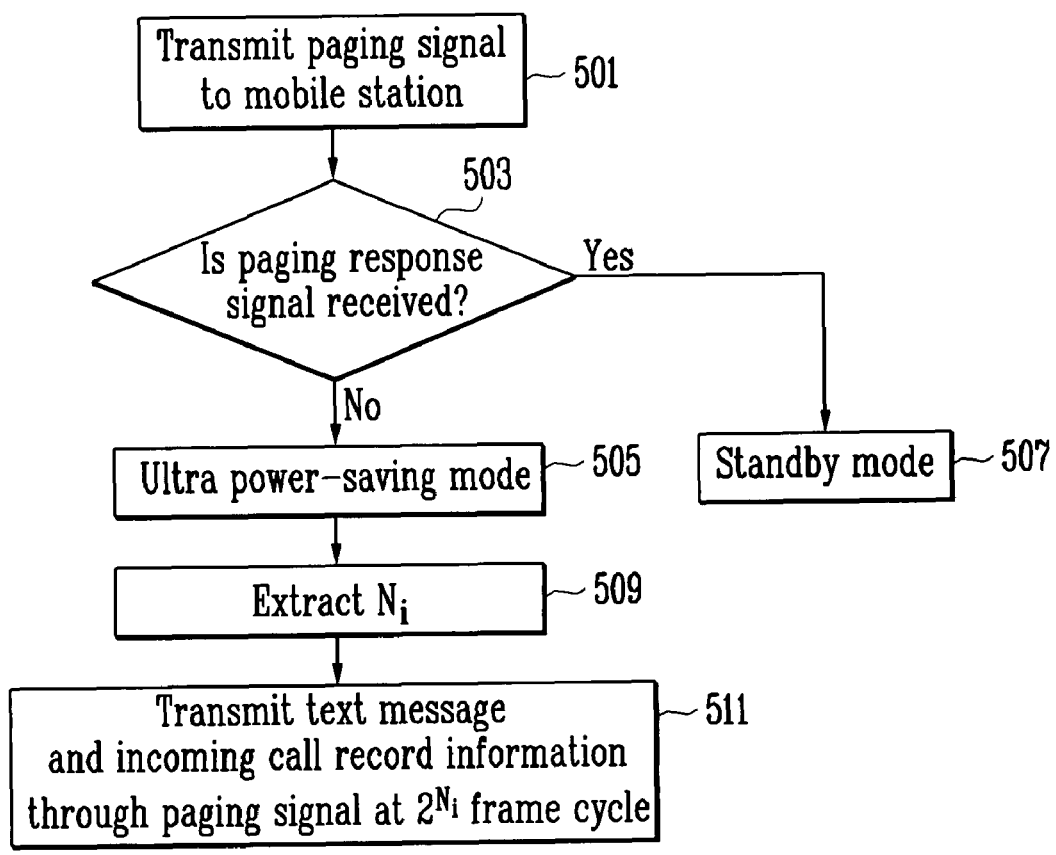
FIG. 5 is a flowchart illustrating a procedure in which a base station transmits information to the mobile station according to the exemplary embodiment of the present invention.

FIG. 5 is a flowchart illustrating a procedure in which the base station transmits information to the mobile station according to the exemplary embodiment of the present invention.

Referring to FIG. 5, the base station transmits the paging signal to the mobile station (step 501). Here, the paging signal is transmitted to match the paging detecting cycle for the standby mode. This is because the ultra power-saving mode is set by a user's intention and thus the base station does not recognize that the operation mode of the mobile station has been changed to the ultra power-saving mode.

Then, the base station waits for a paging response signal (step 503). If it does not receive the paging response signal within a predetermined time, i.e., a time when the paging response signal is expected to be received in the standby mode, the base station determines that the mobile station has entered the ultra power-saving mode (step 505). The base station then extracts the class-specific DRX cycle length coefficient Ni which is pre-set (step 509) and transmits the text message information and the incoming call record information through the paging signal corresponding to the coefficient Ni, i.e., $2^{Ni}$ frame cycle. At this time, even though the mobile station enters the ultra power-saving mode, the base station can not increase its paging cycle as much because the base station does not communicate only with one mobile station. Thus, the base station transmits desired information to the mobile station at the paging cycle that the mobile station can receive.

Meanwhile, if the paging response signal is received within a predetermined time, the base station determines that the mobile station still operates in the standby mode and performs a corresponding operation (step 507).

FIG. 6 is a table illustrating the relationship between a DRX cycle length coefficient and a DRX cycle length according to the exemplary embodiment of the present invention.

Referring to FIG. 6, a DRX cycle length coefficient 601 is in a range of 6 to 9 in a standby mode (610). Since the DRX cycle length depends on 2k frames, the DRX cycle has a length of 64 frames when 'k' is 6 and a length of 512 frames when 'k' is 9. An interval 605 at which the PICH signal is received depends on the length of frames, and the PICH occasion interval 605 is 0.64 seconds when 'k' is 6 and 5.12 seconds when 'k' is 9.

When the DRX cycle is greater than 9, the mobile station enters the ultra power-saving mode, and the DRX cycle length 603 and the PICH occasion internal 605 depend on the coefficient $N_i$.

Here, it can be seen that the DRX cycle length coefficient for the ultra power-saving mode is larger than the DRX cycle length coefficient for the standby mode.

As described above, according to the present invention, it is possible to inactivate the communication function of the mobile station according to a user's intention, thereby providing the ultra power-saving mode in which power consumption of the mobile station is minimized.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for providing an ultra power-saving mode in a mobile station, comprising the steps of:
   inactivating a communication function in a standby mode of the mobile station;
   extracting a DRX (discontinuous reception) cycle length coefficient 'k' of the mobile station;
   determining a class-specific DRX cycle length coefficient $N_i$ of the mobile station;
   replacing 'k' with $N_i$; and
   monitoring a paging signal at a paging detecting cycle corresponding to $N_i$,
   wherein the paging cycle corresponding to $N_i$ is [(IMSI div M) mod DRX cycle length]+($2^{Ni}$), where IMSI represents an international mobile system indicator, M represents a secondary common control physical channel (SCCPCH) coefficient including a paging type 1 signal.

2. The method of claim 1, wherein the DRX cycle has a length of $2^k$ frames.

3. The method of claim 1, wherein $N_i$ is greater than 'k'.

4. The method of claim 1, further comprising the steps of:
   replacing $N_i$ with 'k'; and
   monitoring a paging signal at a paging detecting cycle corresponding to 'k'.

5. The method of claim 1, wherein the paging signal transmitted periodically corresponding to $N_i$ comprises text message information and incoming call record information.

6. A mobile station, comprising:
   a telephone call inactivating portion for inactivating a telephone call function in a standby mode;
   a storing portion for storing a DRX cycle length coefficient 'k' and a class-specific DRX cycle length coefficient $N_i$;
   a mode changing portion for replacing 'k' with $N_i$ to monitor a paging signal at a paging detecting cycle corresponding to $N_i$,
   wherein the paging cycle corresponding to $N_i$ is [(IMSI div M) mod DRX cycle length]+($2^{Ni}$), where IMSI represents an international mobile system indicator, M represents a secondary common control physical channel (SCCPCH) coefficient including a paging type 1 signal, and the DRX cycle length uses $2^k$ which is pre-set.

7. The mobile station of claim 6, wherein $N_i$ is greater than 'k'.

8. The mobile station of claim 6, wherein the paging signal transmitted periodically corresponding to $N_i$ comprises text message information and incoming call record information.

* * * * *